(12) United States Patent
Röckrath et al.

(10) Patent No.: US 6,403,699 B1
(45) Date of Patent: *Jun. 11, 2002

(54) NONAQUEOUS COATING AND PROCESS FOR PRODUCING A TWO-COAT FINISH

(75) Inventors: Ulrike Röckrath, Senden; Ulrich Poth, Münster, both of (DE)

(73) Assignee: BASF Coatings AG, Muenster-Hiltrup (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/513,925

(22) PCT Filed: Mar. 16, 1994

(86) PCT No.: PCT/EP94/00828

§ 371 (c)(1), (2), (4) Date: Sep. 28, 1995

(87) PCT Pub. No.: WO94/22968

PCT Pub. Date: Oct. 13, 1994

(30) Foreign Application Priority Data

Mar. 31, 1993 (DE) .......................................... 43 10 413

(51) Int. Cl.$^7$ ........................... C08F 267/02; B05D 1/36
(52) U.S. Cl. ...................... 524/556; 524/196; 524/197; 524/212; 524/555; 524/558; 524/512; 427/407.1; 427/409; 525/451
(58) Field of Search ............................... 524/556, 555, 524/558, 196, 197, 212, 512; 427/407.1, 409; 525/451

(56) References Cited

U.S. PATENT DOCUMENTS

| | | | |
|---|---|---|---|
| 3,547,848 A | 12/1970 | Marsh et al. | 106/218 |
| 4,311,622 A | 1/1982 | Buter | 524/542 |
| 4,565,730 A * | 1/1986 | Poth et al. | 428/204 |
| 4,677,028 A * | 6/1987 | Heeringa et al. | 428/422.8 |
| 4,839,406 A * | 6/1989 | Nagural et al. | 524/196 |
| 4,965,317 A | 10/1990 | Kania et al. | 525/155 |
| 5,534,306 A * | 7/1996 | Rockrath et al. | 427/407.1 |
| 5,780,541 A * | 7/1998 | Mayenfels et al. | 524/590 |

FOREIGN PATENT DOCUMENTS

EP 0 261 863 9/1987 ............ C09D/5/04

OTHER PUBLICATIONS

Dres. Fitzner & Münch, Letter of 08. Jun. 2000.

* cited by examiner

Primary Examiner—Elizabeth M. Cole
Assistant Examiner—John J. Guarriello

(57) ABSTRACT

The invention relates to nonaqueous coatings containing a polyacrylate resin and a urea group-containing thixotropic agent and having improved surface properties. The polyacrylate resin is prepared by polymerizing (a) from 16 to 51% by weight of a hydroxyl group-containing ester of acrylic acid or methacrylic acid or of a mixture of such monomers; (b) from 32 to 84% by weight of an aliphatic or cycloaliphatic ester of acrylic acid or methacrylic acid which is different from (a) and has at least 4 carbon atoms in the alcohol radical or of a mixture of such monomers; (c) from 0 to 2% by weight of an ethylenically unsaturated carboxylic acid or of a mixture of ethylenically unsaturated carboxylic acids, and (d) from 0 to 30% by weight of an ethylenically unsaturated monomer which is different from (a), (b) and (c) or of a mixture of such monomers. The polyacrylate resin has an acid number of from 0 to 15, a hydroxyl number of from 80 to 140, and a number-average molecular weight of from 1,500 to 10,000, the sum of the proportions by weight of components (a), (b), (c) and (d) always being 100% by weight. The urea group containing thixotropic agent is prepared by reacting a compound selected from the group consisting of polyisocyanates and mixtures thereof, with an aliphatic monoamine selected from the group consisting of primary amines, secondary amines, water, and mixtures thereof, in the presence of the polyacrylate resin, to form a dispersion of the urea group containing thixotropic agent and the polyacrylate resin.

14 Claims, No Drawings

NONAQUEOUS COATING AND PROCESS FOR PRODUCING A TWO-COAT FINISH

BACKGROUND OF THE INVENTION

The invention relates to a nonaqueous coating which contains a polyacrylate resin and a urea group-containing thixotropic agent, and to a process for producing a two-coat finish on a substrate surface.

Processes are known for producing a two-coat finish on a substrate surface, in which
  (1) a pigmented basecoat is applied to the substrate surface
  (2) the basecoat film applied in step (1) is dried at temperatures from room temperature to 80° C.
  (3) a transparent topcoat is applied to the basecoat film dried in step (2), and subsequently
  (4) basecoat and topcoat are baked together.

Nonaqueous coatings containing a polyacrylate resin and a urea group-containing thixotropic agent are known and are described, for example, in European Patent Application EP-A-192 304, in German Offenlegungsschrift DE 23 59 929, in German Auslegeschriften DE 23 59 923 and DE 18 05 693 and in German Patent DE 27 51 761. The use of thixotropic agents in nonaqueous coatings is intended, inter alia, to enable the application of relatively thick coats without the formation of interfering "runs". It is disadvantageous that nonaqueous coatings containing a polyacrylate resin and a urea group-containing thixotropic agent give rise, especially at high solids contents, to coated surfaces which are unsatisfactory with regard to their visual appearance, especially with regard to evenness and gloss.

The invention accordingly has the object of providing nonaqueous coatings containing a polyacrylate resin and a urea group-containing thixotropic agent which give coating films having surface properties which are improved with respect to the prior art.

SUMMARY OF THE INVENTION

This object has surprisingly been achieved by using in the nonaqueous coatings a polyacrylate resin which can be prepared by polymerizing
  (a) from 16 to 51, preferably from 16 to 28, % by weight of a hydroxyl group-containing ester of acrylic acid or methacrylic acid or of a mixture of such monomers
  (b) from 32 to 84, preferably from 32 to 63, % by weight of an aliphatic or cycloaliphatic ester of acrylic acid or methacrylic acid which is different from (a) and has at least 4 carbon atoms in the alcohol radical or of a mixture of such monomers,
  (c) from 0 to 2, preferably from 0 to 1, % by weight of an ethylenically unsaturated carboxylic acid or of a mixture of ethylenically unsaturated carboxylic acids, and
  (d) from 0 to 30, preferably from 0 to 20, % by weight of an ethylenically unsaturated monomer which is different from (a), (b) and (c) or of a mixture of such monomers to give a polyacrylate resin having an acid number of from 0 to 15, preferably from 0 to 8, a hydroxyl number of from 80 to 140, preferably from 80 to 120, and a number-average molecular weight of from 1,500 to 10,000, preferably from 2,000 to 5,000, the sum of the proportions by weight of components (a), (b), (c) and (d) always being 100% by weight.

DESCRIPTION OF THE PREFERRED EMBODIMENTS

The polyacrylate resins employed in accordance with the invention can be prepared by polymerization processes which are generally well known. Polymerization processes for the preparation of polyacrylate resins are generally known and described in many references (cf. e.g.: Houben-Weyl, Methoden der organischen Chemie, [Methods of Organic Chemistry], 4th Edition, Volume 14/1, page 24 to 255 (1961)).

The polyacrylate resins employed in accordance with the invention are preferably prepared using the solution polymerization process. Conventionally, in this process an organic solvent or solvent mixture is initially introduced and heated to the boil. To this organic solvent or solvent mixture are then added, continuously, the monomer mixture to be polymerised and one or more polymerisation initiators. Polymerisation is carried out at temperatures of between 100 and 160° C., preferably between 130 and 150° C. As polymerisation initiators it is preferred to employ free-radical initiators. The nature and quantity of initiator are usually chosen so that the supply of free radicals present during the feed phase at the polymerisation temperature is substantially constant.

Examples of initiators which can be employed are: dialkyl peroxides such as di-tert-butyl peroxide or dicumyl peroxide; hydroperoxides such as cumene hydroperoxide or tert-butyl hydroperoxide; and peresters such as tert-butyl perbenzoate, tert-butyl perpivalate, tert-butyl per-3,5,5-trimethylhexanoate or tert-butyl per-2-ethylhexanoate.

The polymerization conditions (reaction temperature, feed time of the monomer mixture, nature and quantity of the organic solvents and polymerisation initiators, possible additional use of molecular weight regulators, for example mercaptans, thioglycolic acid esters and hydrogen chlorides) are selected so that the polyacrylate resins employed in accordance with the invention have a number-average molecular weight of from 1,500 to 10,000, preferably from 2,000 to 5,000 (determined by gel permeation chromatography using polystyrene as calibration substance).

The acid number of the polyacrylate resins employed in accordance with the invention can be adjusted by the person skilled in the art by using appropriate quantities of component (c). Analogous comments apply to the adjustment of the hydroxyl number. It can be controlled via the quantity of component (a) employed.

It is possible in principle to employ as component (a) any hydroxyl group-containing ester of acrylic acid or methacrylic acid, or a mixture of such monomers. Examples are: hydroxyalkyl esters of acrylic acid, for example hydroxyethyl acrylate, hydroxypropyl acrylate and hydroxybutyl acrylate, especially 4-hydroxybutyl acrylate; hydroxyalkyl esters of methacrylic acid, for example hydroxyethyl methacrylate, hydroxypropyl methacrylate and hydroxybutyl methacrylate, especially 4-hydroxybutyl methacrylate; and reaction products of cyclic esters, for example ε-caprolactone, and hydroxyalkyl esters of acrylic acid and/or methacrylic acid.

The composition of component (a) is preferably selected such that the polyacrylate resin resulting from homopolymerization of component (a) has a glass transition temperature of from −50 to +70, preferably from −30 to +50° C. The glass transition temperature can be calculated approximately by the person skilled in the art using the formula $$\frac{1}{T_G} = \sum_{n=1}^{n=x} \frac{W_n}{T_{Gn}}$$

$T_G$=glass transition temperature of the polymer x=number of different copolymerised monomers, $W_n$=proportion by weight of the nth monomer $T_{Gn}$=glass transition temperature of the homopolymer of the nth monomer.

It is possible in principle to employ as component (b) any aliphatic or cycloaliphatic ester of acryloic acid or methacrylic acid which is different from (a) and has at least 4 carbon atoms in the alcohol radical, or a mixture of such monomers. Examples are: aliphatic esters of acrylic and methacrylic acid having from 4 to 20 carbon atoms in the alcohol radical, for example n-butyl, iso-butyl, tert-butyl, 2-ethylhexyl, stearyl and lauryl acrylate and methacrylate and cycloaliphatic esters of acrylic and methacrylic acid, for example cyclohexyl acrylate and cyclohexyl methacrylate. The composition of component (b) is preferably selected such that the polyacrylate resin resulting from homopolymerization of component (b) has a glass transition temperature of from 10 to 100, preferably from 20 to 60° C.

It is possible in principle to employ as component (c) any ethylenically unsaturated carboxylic acid or a mixture of ethylenically unsaturated carboxylic acids. As component (c) it is preferred to employ acrylic acid and/or methacrylic acid.

It is possible in principle to employ as component (d) any ethylenically unsaturated monomer which is different from (a), (b) and (c), or a mixture of such monomers. Examples of monomers which can be employed as components (d) are: vinyl aromatic hydrocarbons, such as styrene, α-alkyl styrene and vinyl toluene, amides of acrylic acid and methacrylic acid, for example methacrylamide and acrylamide; nitriles of methacrylic acid and acrylic acid; vinyl ethers and vinyl esters. It is preferred to employ as component (d) vinyl aromatic hydrocarbons, especially styrene.

The composition of component (d) is preferably selected such that the resin resulting from homopolymerisation of component (d) has a glass transition temperature of from 70 to 120, preferably from 80 to 100° C.

The urea group-containing thixotropic agents contained in the nonaqueous coatings according to the invention are known and are described, for example, in detail in German Offenlegungsschrift DE 23 59 929, in German Auslegeschriften DE 18 05 693 and DE 23 59 923 and in German Patent DE 27 51 761. They are prepared by reacting a compound containing isocyanate groups, or a mixture of compounds containing isocyanate groups, with primary and/or secondary amines and/or water.

The urea group-containing thixotropic agents employed in the nonaqueous coatings according to the invention are preferably prepared by reacting monoamines, or mixtures of monoamines, with polyisocyanates or mixtures of polyisocyanates, the monoamines and the polyisocyanates being reacted with one another in quantities such that the ratio of equivalents between amino groups and isocyanate groups is between 1.2 and 0.4, preferably between 1.0 and 0.8. The monoamines employed are preferably primary monoamines, particularly preferably araliphatic or aliphatic primary monoamines and very particularly preferably aliphatic primary monoamines having at least 6 carbon atoms in the molecule. Examples of monoamines which can be employed are: benzylamine, ethylamine, n-propylamine, isopropylamine, n-butylamine, isobutylamine, tert-butylamine, pentylamine, n-hexylamine, n-octylamine, iso-nonanylamine, iso-tridecylamine, n-decylamine and stearylamine.

The polyisocyanates which it is possible to employ in principle are all organic compounds containing at least two isocyanate groups per molecule. It is also possible to employ isocyanate group-containing reaction products of, for example, polyols and polyamines and polyisocyanates. It is preferred to employ diisocyanates, very particularly preferably aliphatic diisocyanates and, in particular, hexamethylene diisocyanate. Example [sic] of polyisocyanates which can be employed are: tetramethylene 1,4-diisocyanate, hexamethylene 1,6-diisocyanate, ω,ω'-dipropyl ether diisocyanate, cyclohexyl 1,4-diisocyanate, dicyclohexylmethane 4,4'-diisocyanate, 1,5-dimethyl(2,4-ω-diisocyanato-methyl)benzene, 1,5-dimethyl(2,4-ω-diisocyanato-ethyl)benzene, 1,3,5-trimethyl(2,4-ω-diisocyanato-methyl)benzene, 1,3,5-triethyl(2,4-ω-diisocyanato-methyl)benzene, the trimer of hexamethylene 1,6-diisocyanate, isophorone diisocyanate, dicyclohexyldimethylmethane 4,4'-diisocyanate, 2,4-toluene diisocyanate, 2,6-toluene diisocyanate, diphenylmethane 4,4'-diisocyanate.

The urea group-containing thixotropic agent is preferably prepared in the presence of the polyacrylate resin employed in accordance with the invention. The procedure here is usually such that the amine component is added to a solution of the acrylate resin in an organic solvent or in a mixture of organic solvents and then the polyisocyanate is added as quickly as possible and with very vigorous stirring. The resulting mixture of urea group-containing thixotropic agent and polyacrylate resin can then be employed in the nonaqueous coatings according to the invention.

The nonaqueous coatings according to the invention contain from 30 up to 70, preferably from 40 to 60, % by weight of organic solvents, for example: aliphatic, aromatic and cycloaliphatic hydrocarbons, alkyl esters of acetic acid or propionic acid, alkanols, ketones and glycol ethers and glycol ether esters.

The nonaqueous coatings according to the invention may also contain, in addition to the organic solvents, the polyacrylate resin and the urea group-containing thixotropic agent, crosslinking agents, further binders which are compatible with the polyacrylate resin employed in accordance with the invention, pigments, fillers, light stabilizers and other additives typical for coatings.

It is preferred for the nonaqueous coatings to contain from 25 to 100, preferably from 30 to 70, % by weight, based on the solids content of polyacrylate resin, of a crosslinking agent or of a mixture of crosslinking agents. Examples of crosslinking agents which can be employed are amino resins, especially etherified melamine formaldehyde condensates and blocked and unblocked polyisocyanates, and mixtures of these crosslinking agents. The crosslinking agent is added in a quantity such that the ratio of equivalents between the reactive groups of the binder and the reactive groups of the crosslinking agent is between 1.5 to 0.5 and 0.5 to 1.5, preferably between 1.2 to 0.8 and 0.8 to 1.2.

The nonaqueous coatings according to the invention contain the urea group-containing thixotropic agent in a quantity of from 0.1 to 30.0, preferably from 0.5 to 10 and particularly preferably from 0.1 to 5.0% by weight, based on the total solids content of the nonaqueous coatings according to the invention.

The nonaqueous coatings according to the invention can be applied using conventional application methods, especially by spraying, to any desired substrate, especially to metals, wood, plastic etc.

The coated surfaces which can be produced using the nonaqueous coatings according to the invention have surface properties which are sufficiently outstanding to enable the coatings also to be employed for coating car bodies, especially as transparent coatings in the production of two-coat finishes of the basecoat/clearcoat type. Two-coat finishes of the basecoat/clearcoat type are prepared by (a) applying a pigmented basecoat to the substrate surface (2) drying the basecoat film applied in step (1) at temperatures from room temperature to 80° C.

(3) applying a transparent topcoat to the basecoat film dried in step (2), and subsequently (4) baking the basecoat and topcoat together.

The examples which follow illustrate the invention. All parts or percentages are by weight, unless stated otherwise.

EXAMPLE 1
Preparation of a Polyacrylate Resin Solution 878 parts of a commercially available aromatic solvent having a boiling range of from 158° C. to 172° C. are initially charged to a steel vessel fitted with monomer feed, initiator feed, thermometer, oil heating and reflux condenser, and heated to 140° C. Then a mixture α comprising 87 parts of the aromatic solvent mixture and 87 parts of t-butyl peroctanoate is added with stirring at a rate such that the addition of the mixture α is finished after 4.75 h. 15 min after the commencement of the addition of the mixture α, a mixture β comprising 630 parts of t-butyl acrylate, 217 parts of n-butyl methacrylate, 72 parts of i-butyl methacrylate, 116 parts of styrene, 326 parts of hydroxypropyl methacrylate and 87 parts of butane-1,4-diol monoacrylate is added to the reaction mixture at a rate such that the addition of the mixture β is finished after 4 h. When the addition of the mixture α has finished, the reaction mixture is maintained at 140° C. for a further 2 h and then cooled to room temperature. The resulting acrylate resin solution has a solids content of 62.3% (1 h, 130° C.; circulating-air oven), a viscosity of 7.2 dPas (ICI plate/cone viscometer, 23° C.), an acid number of 4.9 and a hydroxyl number of 111, in each case based on the solids content.

EXAMPLE 2
Preparation of a Polyacrylate Resin Solution Containing Thixotropic Agent 1,850 g of the acrylate resin solution described in Example 1, 130 g of n-butyl acetate and 61 g of n-hexyl amine are weighed in that order into the 2.5 l stirring vessel of a dissolver having a dissolver disk with a diameter of 90 mm. 130 g of n-butyl acetate and 50 g of hexamethylene diisocyanate are weighed into a preliminary vessel and premixed. Dissolution is carried out at 1,400 rpm, and the contents of the preliminary vessel are metered into the stirring vessel at a uniform rate over the course of 10 min. Subsequently, dissolution is carried out for a further 20 min at 1,400 rpm. A thixotropic dispersion is formed having a non volatile fraction of 50%, of which 5% is urea particles.

EXAMPLE 3
Preparation of a Transparent Topcoat

The following components are weighed into a 2 l stirring vessel in the given order and are mixed by stirring: 523.5 g of the acrylate resin solution described in Example 1, 360.0 g of the thixotropic dispersion described in Example 2, 342.0 g of a commercially available, butanol-etherified, imino group-containing melamine-formaldehyde resin as an 80% solution in n-butanol, 18.0 g of a commercially available UV absorber based on a benzotriazole derivative and dissolved in 45 g of xylene, 15.0 g of a commercially available free-radical scavenger based on a sterically hindered piperidine derivative and dissolved in 30 g of xylene, 15.0 g of a 1% strength solution of a commercially available modified polysiloxane as levelling agent, 60.0 g of n-butanol and 91.5 g of the aromatic solvent described in Example 1.

The transparent topcoat prepared in this way has a non-volatile fraction of 52.0% and a viscosity of 43 sec., measured in a DIN 4 flow cup at 20° C.

EXAMPLE 4
Production of a Two-coat Finish of the Basecoat/clearcoat Type

On commercially available metal bodywork panels passivated with zinc phosphate—in some cases having a row of perforations (perforations with a diameter of 1 cm)—and coated with 23 μm of a commercially available cationic electrodeposition coating and 35 μm of a commercially available, gray, baking filler, a high-performance pneumatic spray gun is used to apply—in two applications—14 μm (measured as the dry film) of a commercially available aqueous, silver metallic basecoat. The panels are predried at 80° C. in a circulating-air oven for 5 min and cooled to 40° C. Subsequently the transparent topcoat described in Example 3, which has been adjusted to a viscosity of 28 sec, measured in a DIN 4 flow cup at 20° C., using a mixture of 60% xylene and 40% n-butyl acetate, is applied in two spray passes using said spray gun so that dry film thicknesses of from 20 to 65 μm are formed. In addition, panels having a dry film thickness of the transparent topcoat of 42 μm are prepared.

The panels are predried at room temperature for 8 minutes. Then some of the panels are baked in a circulating-air oven at 140° C. for 20 minutes in the vertical position (75°) and the remaining panels are baked in the same way horizontally. After the panels have cooled, the finishes are evaluated.

The perforated panels which were dried vertically exhibit no runs longer than 0.5 cm at the perforations for film thicknesses of up to 57 μm.

The metallic effect, measured by measuring the reflection of light using a goniophotometer, viewed perpendicularly and obliquely, differs by less than 4% as a function of the film thickness and on comparison of the horizontally and vertically baked panels.

The gloss of the finishes, measured at an angle of 20°, is greater than 89% for all panels and at all film thicknesses.

The evenness of the transparent topcoats over the metallic basecoat, measured as the DOI (distinctness of image, NISSAN apparatus), differs by less than 8% as a function of the film thickness and on comparison of the horizontally and vertically baked panels.

What is claimed is:

1. A nonaqueous coating containing a polyacrylate resin and a urea group-containing thixotropic agent, wherein the polyacrylate resin is prepared by polymerizing (a) from 16 to 51% by weight of monomers selected from the group consisting of hydroxyl group-containing esters of acrylic acid, methacrylic acid and mixtures thereof, (b) from 32 to 84% by weight of a monomer selected from the group consisting of aliphatic esters of acrylic acid, aliphatic esters of methacrylic acid, cycloaliphatic esters of acrylic acid, cycloaliphatic esters of methacrylic acid, and mixtures thereof, where said monomers are different from (a) and have at least 4 carbon atoms in the alcohol radical, (c) from 0 to 2% by weight of an acid selected from the group consisting of ethylenically unsaturated carboxylic acids and mixtures thereof, and (d) from 0 to 30% by weight of an ethylenically unsaturated monomer which is different from (a), (b) and (c) or of a mixture of such monomers to give a polyacrylate resin having an acid number of from 0 to 15, a hydroxyl number of from 80 to 140, and a number-average molecular weight of from 1500 to 10,000, the sum of the proportions by weight of components (a), (b), (c) and (d) always being 100% by weight, and the urea group-containing thixotropic agent is prepared by reacting a compound selected from the group consisting of polyisocyanates and mixtures thereof, with an aliphatic primary monoamine having at least six carbon atoms in the molecule, in the presence of the polyacrylate resin, to form a dispersion of the resulting urea group-containing thixotropic agent and the polyacrylate resin.

2. Nonaqueous coating according to claim 1, wherein the composition of component (a) is selected such that the polyacrylate resin resulting from homopolymerization of component (a) has a glass transition temperature of from −50 to +70° C.

3. Nonaqueous coating according to claim 1 wherein the composition of component (b) is selected such that a polyacrylate resin resulting from homopolymerization of component (b) has a glass transition temperature of from 10 to 100° C.

4. Nonaqueous coating according to claim 1 wherein the composition of component (d) is selected such that the resin resulting from homopolymerization of component (d) has a glass transition temperature of from 70 to 120° C.

5. Nonaqueous coating according to claim 1, wherein the polyacrylate resin is prepared by polymerizing from 16 to 28% by weight of component (a), from 32 to 63% by weight of component (b), from 0 to 1% by weight of component (c) and from 0 to 20% by weight of component (d) to give a polyacrylate resin having an acid number of from 0 to 15, a hydroxyl number of from 80 to 140, and a number-average molecular weight of from 1,500 to 10,000.

6. Nonaqueous coating according to claim 1, wherein the urea group-containing thixotropic agent is prepared by reacting an aliphatic primary monoamine with a diisocyanate.

7. Process for producing a two-coat finish on a substrate surface, comprising
  (1) applying a pigmented basecoat to a substrate surface
  (2) drying the basecoat film applied in step (1) at temperatures from room temperature to 80° C.
  (3) applying a transparent topcoat according to claim 1, to the basecoat film dried in step (2), and subsequently
  (4) baking together the basecoat and topcoat.

8. Nonaqueous coating composition according to claim 1, wherein the polyacrylate resin resulting from homopolymerization of component (a) has a glass transition temperature of from −30 to +50° C.

9. Nonaqueous coating composition according to claim 1, wherein polyacrylate resin resulting from homopolymerization of component (b) has a glass transition temperature of from 20 to 60° C.

10. Nonaqueous coating composition according to claim 1, wherein the resin resulting from homopolymerization of component (d) has a glass transition temperature of from 80 to 100° C.

11. Nonaqueous coating composition according to claim 1, wherein the polyacrylate resin is prepared by polymerizing from 16 to 28% by weight of component (a), from 32 to 63% by weight of component (b), from 0 to 1% by weight of component (c) and from 0 to 20% by weight of component (d) to give a polyacrylate resin having an acid number of from 0 to 8, hydroxyl number of from 80 to 120, and a number-average molecular weight of from 2,000 to 5,000.

12. A method for the production of a non-aqueous coating composition comprising polymerizing a polyacrylate resin from:

(a) from 16 to 51% by weight of monomers selected from the group consisting of hydroxyl group-containing esters of acrylic acid, methacrylic acid and mixtures thereof,
  (b) from 32 to 84% by weight of a monomer selected from the group consisting of aliphatic esters of acrylic acid, aliphatic esters of methacrylic acid, cycloaliphatic esters of acrylic acid, cycloaliphatic esters of methacrylic acid, and mixtures thereof, where said monomers are different from (a) and have at least 4 carbon atoms in the alcohol radical,
  (c) from 0 to 2% by weight of an acid selected from the group consisting of ethylenically unsaturated carboxylic acids and mixtures thereof, and
  (d) from 0 to 30% by weight of an ethylenically unsaturated monomer which is different from (a), (b) and (c) or of a mixture of such monomers to give a polyacrylate resin having an acid number of from 0 to 15, a hydroxyl number of from 80 to 140, and a number-average molecular weight of from 1500 to 10,000, the sum of the proportions by weight of components (a), (b), (c) and (d) always being 100% by weight, and forming a urea group-containing thixotropic agent by reacting a compound selected from the group consisting of polyisocyanates and mixtures thereof, with an aliphatic primary monoamine having at least six carbon atoms in the molecule, in the presence of the polyacrylate resin, to form a dispersion of the urea group-containing thixotropic agent and the polyacrylate resin.

13. A nonaqueous coating composition consisting of a polyacrylate resin, a urea group-containing thixotropic agent, crosslinking agents, pigments, fillers, light stabilizers, and additives, wherein the polyacrylate resin is prepared by polymerizing (a) from 16 to 51% by weight of monomers selected from the group consisting of hydroxyl group-containing esters of acrylic acid, methacrylic acid and mixtures thereof,
  (b) from 32 to 84% by weight of a monomer selected from the group consisting of aliphatic esters of acrylic acid, aliphatic esters of methacrylic acid, cycloaliphatic esters of acrylic acid, cycloaliphatic esters of methacrylic acid, and mixtures thereof where said monomers are different from (a) and have at least 4 carbon atoms in the alcohol radical,
  (c) from 0 to 2% by weight of an acid selected from the group consisting of ethylenically unsaturated carboxylic acids and mixtures thereof, and
  (d) from 0 to 30% by weight of an ethylenically unsaturated monomer which is different from (a), (b) and (c) or of a mixture of such monomers to give a polyacrylate resin having an acid number of from 0 to 15, a hydroxyl number of from 80 to 140, and a number-average molecular weight of from 1500 to 10,000, the sum of the proportions by weight of components (a), (b), (c) and (d) always being 100% by weight, and the urea group containing thixotropic agent consists of the reaction product of reacting a compound selected from the group consisting of polyisocyanates and mixtures thereof, with an aliphatic monoamine selected from the group consisting of primary amines, secondary amines, water and mixtures thereof, in the presence of the polyacrylate resin, to form a dispersion of the resulting urea group containing thixotropic agent and the polyacrylate resin.

14. A method for the production of a non-aqueous coating composition consisting of a polyacrylate resin, a urea group-containing thixotropic agent, crosslinking agents, pigments, fillers, light stabilizers, and additives, comprising polymerizing the polyacrylate resin from:

(a) from 16 to 51% by weight of monomers selected from the group consisting of hydroxyl group-containing esters of acrylic acid, methacrylic acid and mixtures thereof, (b) from 32 to 84% by weight of a monomer selected from the group consisting of aliphatic esters of acrylic acid, aliphatic esters of methacrylic acid, cycloaliphatic esters of acrylic acid, cycloaliphatic esters of methacrylic acid, and mixtures thereof, where said monomers are different from (a) and have at least 4 carbon atoms in the alcohol radical, (c) from 0 to 2% by weight of an acid selected from the group consisting of ethylenically unsaturated carboxylic acids and mixtures thereof, and (d) from 0 to 30% by weight of an ethylenically unsaturated monomer which is different from (a), (b) and (c) or of a mixture of such monomers to give a polyacrylate resin having an acid number of from 0 to 15, a hydroxyl number of from 80 to 140, and a number-average molecular weight of from 1500 to 10,000, the sum of the proportions by weight of components (a), (b), (c) and (d) always being 100% by weight, and forming a urea group-containing thixotropic agent consisting of the reaction product of reacting a compound selected from the group consisting of polyisocyanates and mixtures thereof, with an aliphatic monoamine selected from the group consisting of primary amines, secondary amines, water and mixtures thereof, in the presence of the polyacrylate resin, to form a dispersion of the urea group-containing thixotropic agent and the polyacrylate resin.

* * * * *